US008485681B2

(12) United States Patent
Richter (10) Patent No.: US 8,485,681 B2
(45) Date of Patent: Jul. 16, 2013

(54) SMART SAFETY GLOVE, WRISTBAND AND METHOD

(76) Inventor: Lars Richter, Trinity, NC (US)

(*) Notice: Subject to any disclaimer, the term of this patent is extended or adjusted under 35 U.S.C. 154(b) by 65 days.

(21) Appl. No.: 13/231,145

(22) Filed: Sep. 13, 2011

(65) Prior Publication Data

US 2012/0069552 A1  Mar. 22, 2012

Related U.S. Application Data

(60) Provisional application No. 61/385,295, filed on Sep. 22, 2010.

(51) Int. Cl.
*F21V 21/08* (2006.01)
*A41D 25/00* (2006.01)

(52) U.S. Cl.
USPC ............... 362/103; 362/276; 2/160; 315/134; 700/63

(58) Field of Classification Search
USPC .. 362/103, 802, 276; 2/160; 700/63; 315/134
See application file for complete search history.

(56) References Cited

U.S. PATENT DOCUMENTS

| | | | | |
|---|---|---|---|---|
| 1,630,730 A | * | 5/1927 | Daugherty | 116/35 R |
| 6,006,357 A | * | 12/1999 | Mead | 2/160 |
| 6,709,142 B2 | * | 3/2004 | Gyori | 362/554 |
| 6,715,213 B2 | | 4/2004 | Richter | 33/328 |
| 7,013,490 B2 | * | 3/2006 | Senter et al. | 2/160 |
| 7,089,099 B2 | * | 8/2006 | Shostak et al. | 701/29.6 |
| 7,163,308 B2 | | 1/2007 | Ferrari et al. | 362/103 |
| 7,347,578 B1 | | 3/2008 | Nourse | 362/103 |
| 7,399,099 B2 | * | 7/2008 | Stokes | 362/103 |
| 7,597,449 B2 | * | 10/2009 | Stokes | 362/103 |
| 7,674,195 B2 | | 3/2010 | Romcevich | 473/451 |
| 7,959,314 B1 | * | 6/2011 | Rodriguez | 362/103 |
| 8,063,567 B2 | * | 11/2011 | Chen | 315/134 |

* cited by examiner

*Primary Examiner* — Ali Alavi
(74) *Attorney, Agent, or Firm* — MacCord Mason PLLC (57) ABSTRACT

A smart safety glove, wristband, method and kit is shown and described. In one embodiment, the glove or wristband includes an enclosing shell, a printed circuit board and a light configured to indicate intentions to traffic. In particular embodiments, the glove is in a sleep mode in a substantially horizontal position and the light is illuminated in a substantially vertical position. A method of hand signaling using a smart safety glove includes positioning the smart glove from the substantially horizontal sleep position to a predefined substantially vertical signaling position.

19 Claims, 9 Drawing Sheets

Fig. 8c

SMART SAFETY GLOVE, WRISTBAND AND METHOD

This application claims the benefit of provisional application No. 61/385,295, filed Sep. 22, 2010.

FIELD OF THE TECHNOLOGY

The present disclosure relates generally to safety apparel, and more particularly to an improved smart safety glove, wristband and method.

BACKGROUND

Cyclists, snowmobilers, horse riders, all-terrain vehicle users and other motorists using vehicles without signal lights often use hand signals to indicate their intentions to traffic. However, environmental factors, road conditions, visibility constraints, including dark conditions and the like, often impair or diminish the effectiveness of hand signals. Applicant believes a smart safety glove and wristband will help overcome many of these problems associated with motorist hand signals.

Protective gloves are well known and encompass a wide variety of materials that function as a protection for the human body from riding elements and the environment. Further, the use of athletic gloves having absorbing protective padding in the palms is also well known. For example, athletic gloves, and in particular cycling, motorcycle, and snowmobile gloves, are advantageous because they aid in gripping a handlebar, provide cushioning and protect hands from abrasions in the event of a collision or fall.

Therefore, Applicants desire a safety glove and wristband utilizing many of the benefits of protective gloves to aid motorist hand signals, and particularly when used to indicate intentions to traffic.

SUMMARY

In accordance with the present disclosure, a smart safety glove or wristband is provided to aid motorist hand signals. This disclosure provides an improved glove, wristband, method and kit that is convenient, efficient, and safe for the user, particularly when used to indicate intentions to traffic. This disclosure may allow for refabrication of existing gloves and may also provide an improved circuitry system for signaling motorist hand signals.

One aspect of the present disclosure is to provide a smart safety glove having a number of strategically-located safety lights that are activated by specific arm or hand angle or movement configurations. Typically, these angles and movement configurations correlate with universal motorist hand signals.

In one embodiment, a safety glove for indicating intentions to traffic includes a shell, a printed circuit board (PCB) and a light in electrical communication with the PCB and positioned visibly on the shell. The flexible shell may include a palm side, distal ends configured for fingers, and a proximate end configured for a wrist. The PCB may support a central processing unit (CPU) and an accelerometer embedded in the shell. The accelerometer may be a microelectromechanical (MEM) accelerometer.

Typically, when the safety glove is in a substantially horizontal position the glove is in a sleep mode. Similarly, when the safety glove is put into a substantially vertical position the light is illuminated. In this substantially vertical position, the glove is adapted to indicate intentions to traffic.

In other embodiments, an electrical power supply having power supply conductors is embedded in the shell. For example, a battery may be embedded in the shell to power the PCB.

Another aspect of the present disclosure is to provide a safety glove with lights positioned on at least one portion of the shell. For example, lights may be positioned on the distal ends, the proximate end, and/or on an outer surface. The lights may be light-emitting diodes (LEDs).

Yet another aspect of the disclosure is to provide a safety wristband having a shell, an accelerometer embedded in the shell and a light. The shell may be adapted to be secured to a user's wrist. The wristband may include a printed circuit board supporting a central processing unit and the accelerometer. The light may be in electrical communication with the central processing unit and positioned on the shell. Here, the glove is in a sleep mode in a substantially stationary horizontal position and the light is illuminated in a predefined moving or substantially vertical position.

Another aspect of the disclosure is to provide a kit for assembly and/or re-fabrication of a safety glove or wristband. The kit may include a printed circuit board to support a central processing unit and an accelerometer that can be embedded in the shell of the glove or wristband. The kit may also include a light that is in electrical communication with the printed circuit board and may be positioned visibly on the shell of the glove or wristband.

A further aspect of the disclosure is to provide a method of hand signaling using a smart safety glove having a central processing unit, an accelerometer and a light in electrical communication with the central processing unit. Another aspect of the disclosure is to provide a method that has particular application in situations where time for hand signal motioning is of the essence and single hand activation is advantageous, for example, in bicycling, motorcycling, snowmobiling and the like activities. In some embodiments, the method may include positioning the smart glove from a substantially horizontal sleep position to a substantially vertical signaling position to illuminate the light in a predetermined sequence. The glove can also be useful in other applications, such as traffic policeman that give hand signals to vehicle traffic, for example at intersections, airports, when directing airplane pilots to gates, etc.

The above summary was intended to summarize certain embodiments of the present disclosure. Embodiments will be set forth in more detail in the figures and description of embodiments below. It will be apparent, however, that the description of embodiments is not intended to limit the present invention, the scope of which should be properly determined by the appended claims.

BRIEF DESCRIPTION OF THE DRAWINGS

Embodiments of the disclosure will be better understood by a reading of the Description of Embodiments along with a review of the drawings, in which:

FIG. 1B is a top-perspective view of the smart glove according to the embodiment shown in FIG. 1a;

DESCRIPTION OF EMBODIMENTS

In the following description, like reference characters designate like or corresponding parts throughout the several views. Also in the following description, it is to be understood that such terms as "forward," "rearward," "left," "right," "upwardly," "downwardly," and the like are words of convenience and are not to be construed as limiting terms.

Figure 1A:
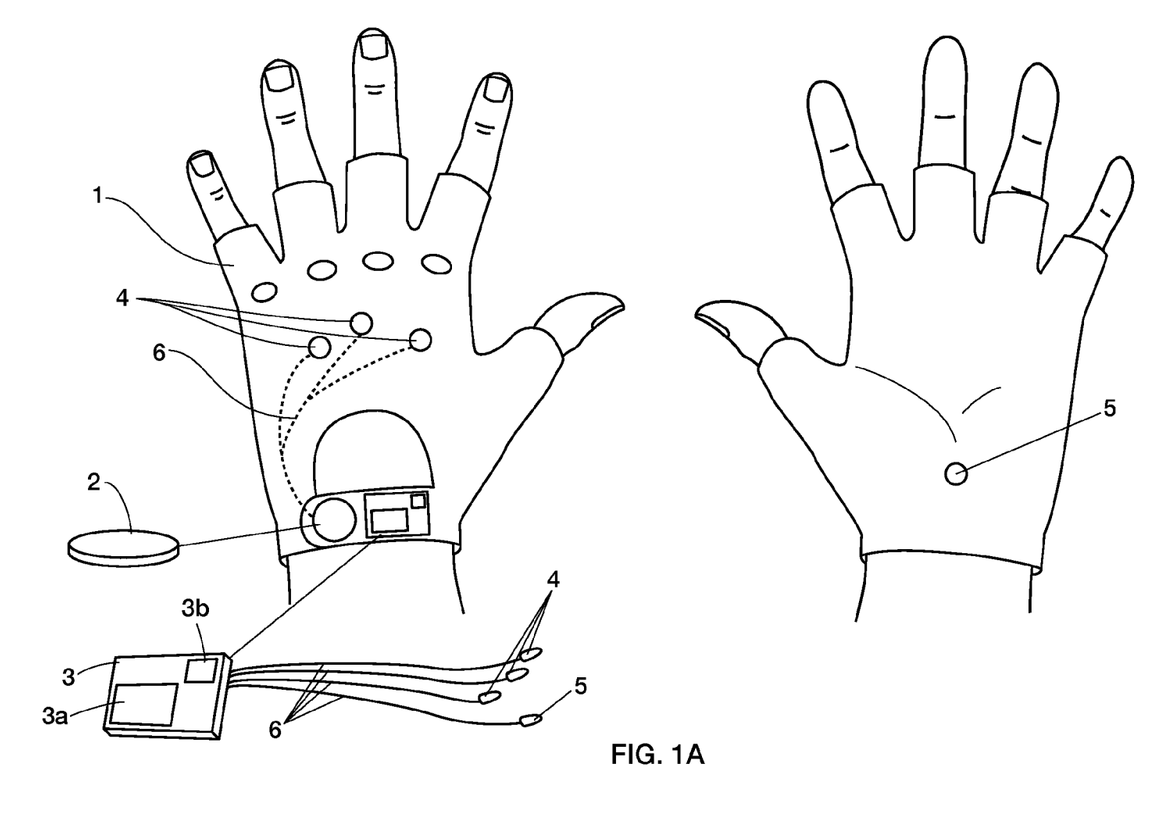
FIG. 1A is a perspective exploded view of a front and back side of a smart glove according to an embodiment of the disclosure, where one glove is showing the palm side and the other is showing the back side.

It will be understood that the illustrations are for the purpose of describing embodiments of the disclosure and are not intended to limit the disclosure or any invention thereto. As best seen in FIG. 1A, a smart glove 1 is shown embodied according to the present disclosure. Smart glove 1 may include a printed circuit board 3 to mechanically support and electrically connect a central processing unit 3a and an accelerometer 3b that is powered by battery 2. Further, at least one light 4, 5 may be in electrical communication with the central processing unit 3a and positioned on the glove 1 in a manner that is visible to traffic. Therefore, as shown in the figures, glove 1 is a smart, self-activated safety device configured to detect hand signaling motions and serve as a light beacon to indicate intentions to traffic. These make hand signals more conspicuous.

Figure 1B:
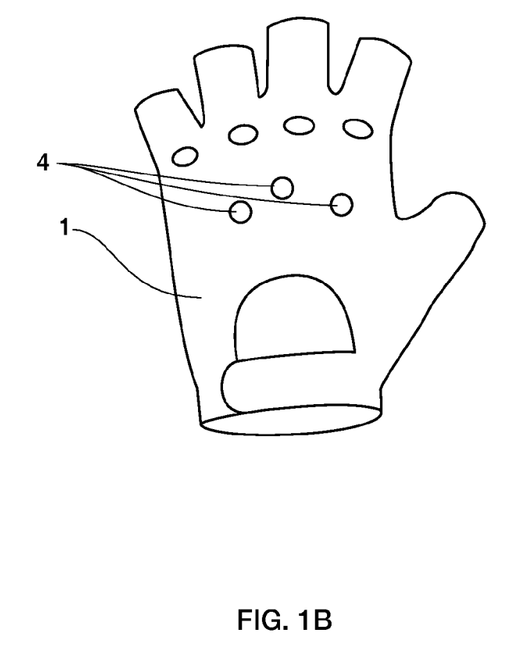

As shown in FIGS. 1A and 1B, glove 1 generally includes a body portion and distal finger ends adapted to be worn on a user's hand. The distal finger ends may include a thumb sheath extending substantially from the wrist, for example to cover the first phalanx of the thumb. Typically, the body portion includes a palm underside and a topside which respectfully cover portions, or all, of the palm area and topside of the user's hands when the glove is worn. In some embodiments, the palm side and distal ends are adapted so that a user wearing the glove 1 may engage the handlebar of a bicycle, motorcycle, snowmobile and the like.

The body of the glove 1 may be constructed of any material, including a lightweight water-resistant material which can be worn during the operation of a bicycle, motorcycle, snowmobile or the like. Further, the material of glove 1 may also include a mesh fabric or the like to allow cooling air to circulate through the glove 1 to cool both the user and/or the electrical components. The structure of the glove is not critical, as long as it can suitable support the items mentioned herein.

Figure 2:
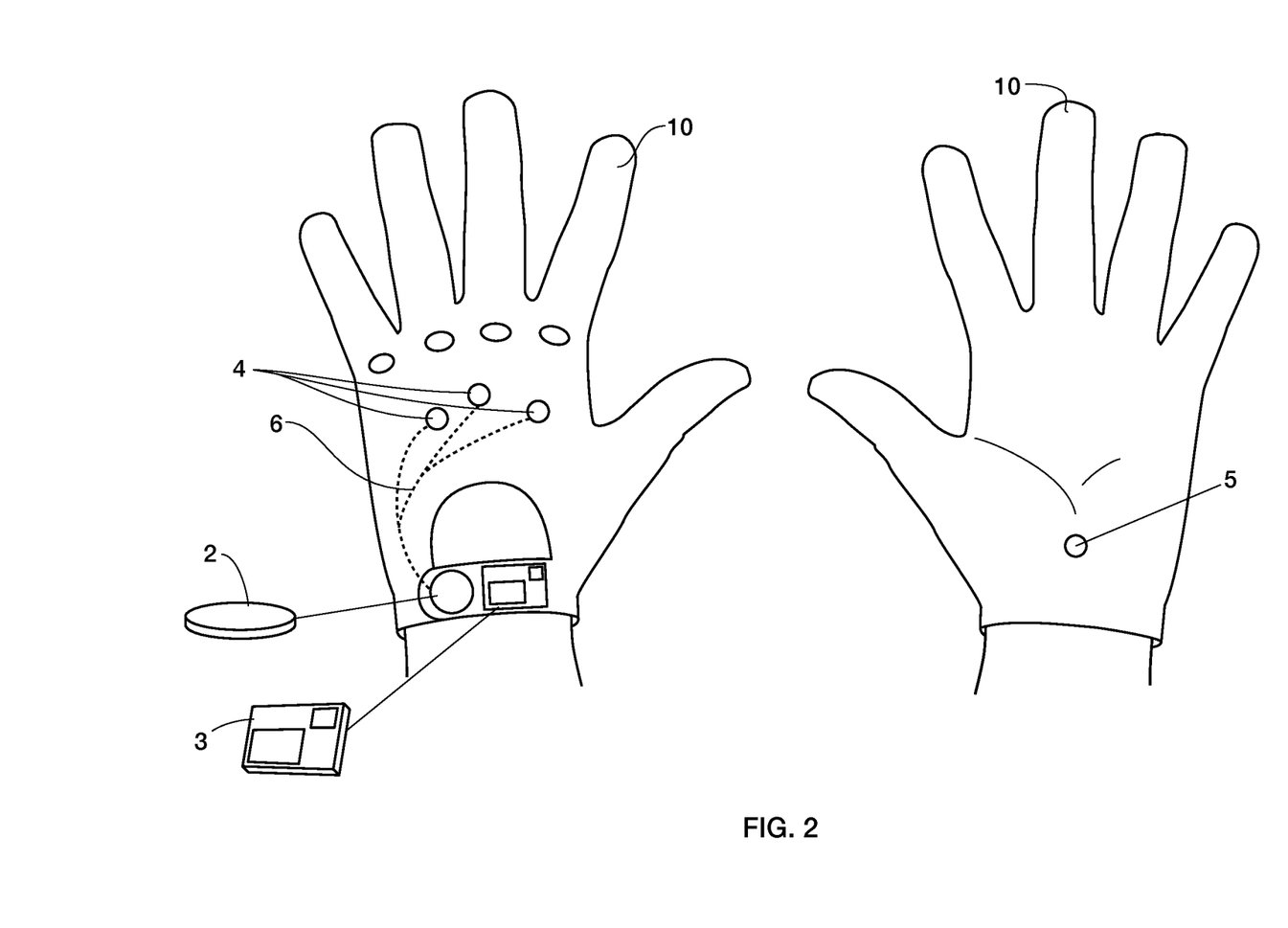
FIG. 2 is a perspective exploded view of another embodiment of the backside of smart glove having closed distal finger ends.
Figure 3:
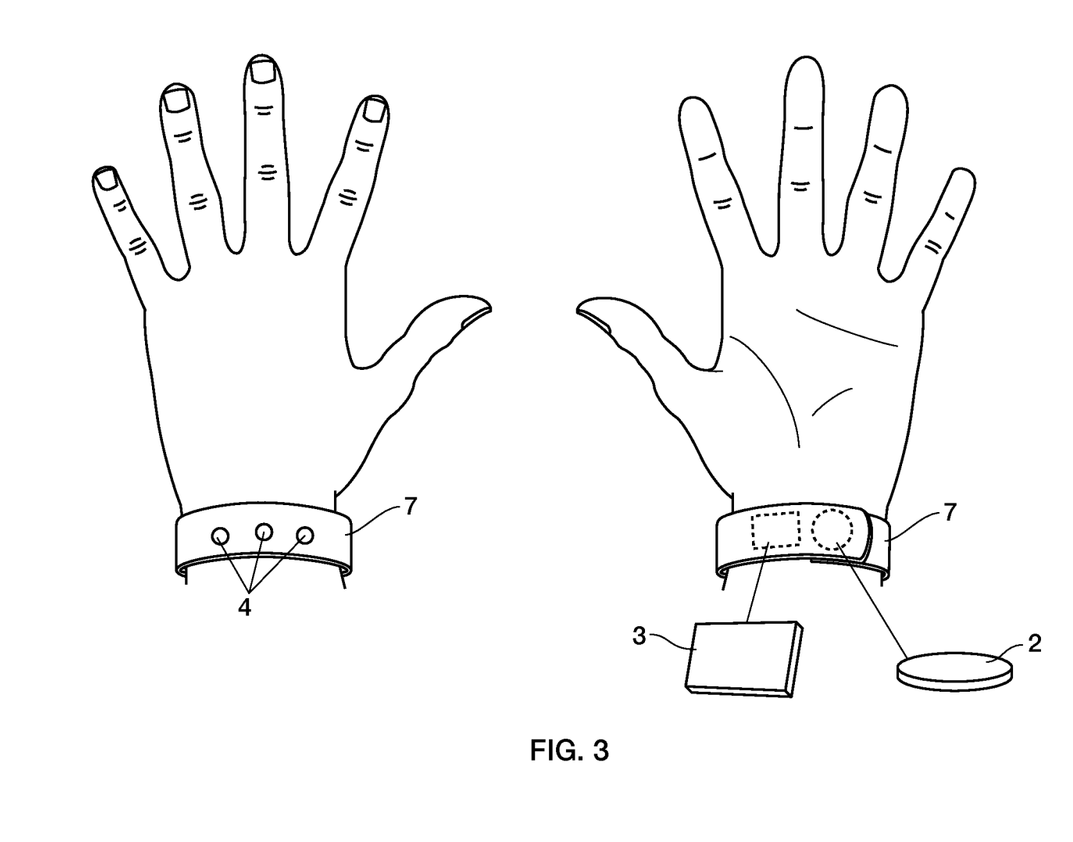
FIG. 3 is a perspective exploded view of a front and back side of a safety wristband according to an embodiment of the disclosure, where one safety wristband is showing the palm side and the other is showing the back side.

The glove 1 is formed to receive a hand and to be positioned on a wrist but can be found up the arm as described herein. A wrist strap 14 may secure the glove 1 to the user and house any of the electrical components described below. For example, as shown in FIGS. 1-3, a hook material may be attached to the back surface of the proximate end of the glove. Similarly, a loop material may be attached to the outer surface of the glove 1. It will be understood by one of ordinary skill in the art that the locations of the hook material and loop material may be reversed. Other embodiments include buttons, zippers and other fasteners to secure the glove 1 to a user.

While the glove in FIGS. 1A and 1B is shown having short distal open ends for fingers, other embodiments include closed distal ends 10 for complete finger coverage as seen in FIG. 2. Such embodiments may be constructed and arranged for use in winter temperatures or other extreme conditions.

Further, glove 1 may include a plurality of pads constructed and arranged in a variety of styles. For example, finger pads may extend approximately from the distal ends to the proximate end for a wrist. In some embodiments, the pads may span parallel to one another thereby forming channels to space and secure any of the electrical components. Similarly, pads in the palm and underside of the glove may provide additional support and protection for electrical components.

FIG. 3 illustrates an alternative embodiment of the smart traffic signaling device. As shown in FIG. 3, the smart safety device may be embedded in a wristband form. In this embodiment, the wristband may comprise electrical components and circuitry configured to indicate intentions to traffic, e.g. any of the electrical components subsequently shown or described, including lights 4 and PCB 3.

Figure 4:
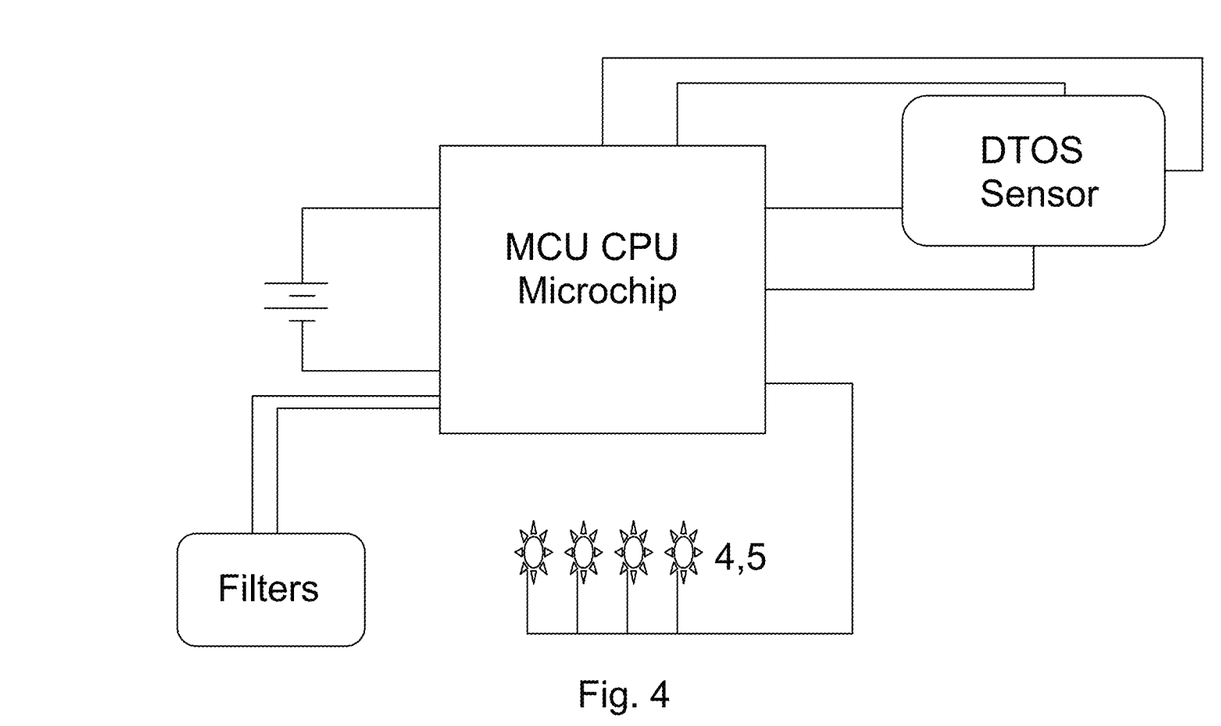
FIG. 4 is a schematic of the electrical configuration of any of the embodiments shown in FIGS. 1-3.

FIG. 4 shows schematically the printed circuit board (PCB) 3 as described hereinafter in possible exploded perspective views.

Figure 5:
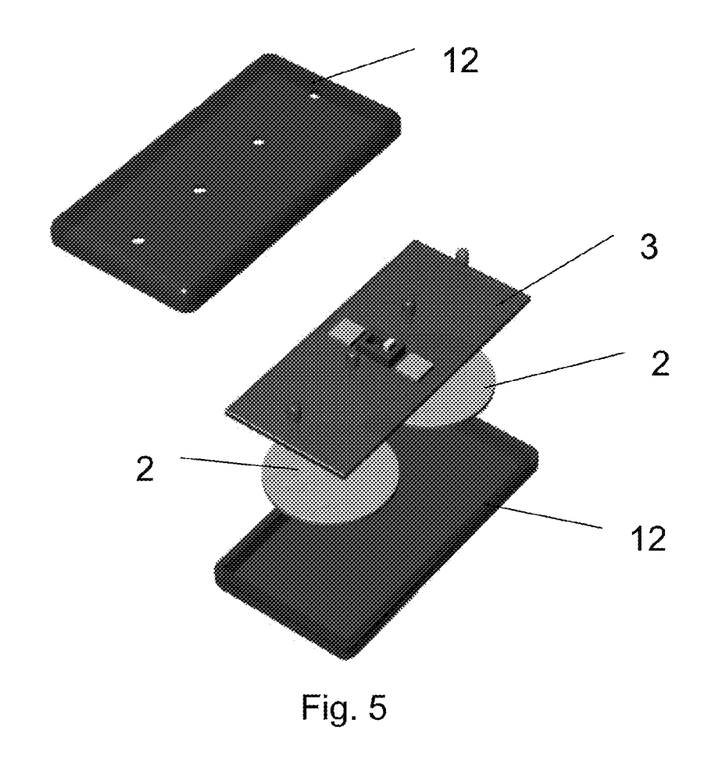
FIG. 5 is an exploded view of a printed circuit board and batteries of any of the embodiments shown in FIGS. 1-3 encased in an enclosure.
Figure 6:
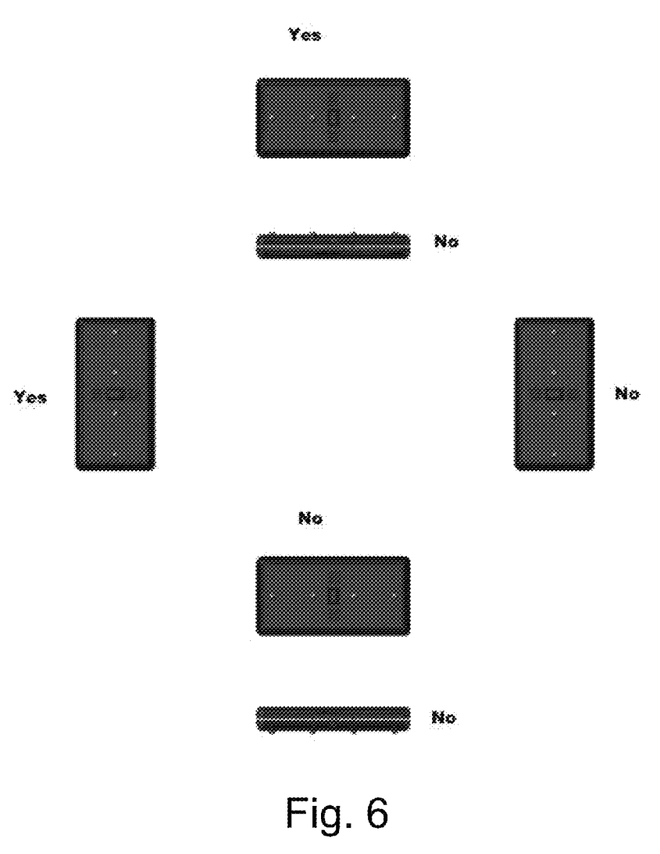
FIG. 6 is an operation orientation diagram of any of the embodiments shown in FIGS. 1-3.

As shown in FIGS. 5-6, the printed circuit board (PCB) 3 may be used to mechanically support and/or electrically connect a central processing unit (CPU) 3a and a position sensing device, such as a microelectromechanical (MEM) accelerometer 3b, mechanical accelerometer, MCU, tilt means or the like.

The position-sensing device, for example the MEM accelerometer 3b, is a sensitive accelerometer used to sense the orientation and/or acceleration of the smart glove 1 or wristband 7. Those of ordinary skill in the art will know how to program the MEM accelerometer 3b to sense desired angular dispositions. An embodiment is supported by prior U.S. Pat. No. 6,715,213

At least one light is positioned on the safety device so that the at least one light can be deployed so it is visible to traffic. As shown in FIGS. 1-4, a plurality of lights 4 may be embedded in the topside of the body portion of glove 1. Other embodiments include a stop light 5 embedded in the palm of the glove 1. However, the lights 4,5 may be positioned in a variety of locations and styles along the exterior of glove 1, including along the finger tips, along the proximate end of the wrist and/or forearm and along any other section of the topside or underside that is visible to traffic. In particular embodiments, lights 4,5 may be light-emitting diode (LEDs). Modern LEDs output light with only a minimal power consumption making them a strong choice for the lightweight portable units of embodiments of this invention Electrical wiring, or similar conductors, which supply power to the lights 4,5 may be concealed in the encasing shell of the glove or wristband, for example by being embedded in the topside of the shell, thereby being protected between the fabric of the glove from the user and from the elements. In other embodiments, the shell may be secured adjacent to the glove 1, for example on apparel, i.e. on a jacket, etc. worn by the user A power supply housing a battery 2 for supplying electrical power to the lights 4,5 is placed in a suitable housing. Battery 2 may be a dry cell, "button-type" lithium battery which provides extremely long life coupled with a light weight structure. For instance, battery 2 may be a pair of batteries of about eighteen millimeters in diameter. Other embodiments include other sizes, forms and voltages of batteries.

As shown in FIGS. 1-3, the enclosure may be located in the proximate end of the wrist, however other embodiments include other suitable positions, including along the finger tips, in an adjacent compartment that is coplanar to the palm or the like.

As shown in FIG. 5, the printed circuit board PCB 3 may be further encased within a protective enclosure 12. Enclosure 12 may include a top portion and a bottom portion that mate together to form enclosure 12 that entirely encases the printed circuit board 3. In other examples, enclosure 12 also encases corresponding power components, for instance batteries 2, as indicated in FIG. 5. Generally, the PCB 3 connects and supports lights 4,5 and batteries 2. In one example, PCB 3 is rectangular shaped, with about forty, for instance about forty-three, millimeters in length and about twenty, for instance about twenty-one, millimeters in width. As illustrated in FIG. 5, this example includes a pair of batteries 2 supported on PCB 3. Other embodiments include an external electrical circuit configured to manually operate a switch for supply power to the circuit, with subsequent MEM activation when appropriate.

As shown in FIG. 6, the glove 1 activates a predetermined lighting sequence of lights 4,5 under the influence of external accelerations and orientations. Typically, the lighting sequence correlates to hand movements created by motorist hand signals. For example, when the glove 1 is in a substantially horizontal position (i.e. palm faced down or face up) it is in sleep mode with none of the lights 4,5 illuminated. The sleep mode may represent a normal riding position, where the user has both hands substantially parallel with the handlebars. However, when the glove 1, or wristband 7, is positioned into a substantially vertical position, i.e. in a substantially vertical plane (i.e. with the pinkie lower than the thumb or finger tips with the hands at the top of the hand), a predetermined zero or ninety degree movement with respect to an axis perpendicular to the user (i.e. with respect to an axis when the user extends the glove parallel with the ground, for example simulating a glove resting position on handlebars) causes the accelerometer 3b to notify the central processing unit 3a to activate the lights 4,5.

It will be understood by one of ordinary skill in the art that users may not produce precise hand signals. Therefore, an extra degree design factor is advantageous. For example a plus/minus ten degree design factor may be helpful to allow a user to better locate a predefined hand position to activate the lighting sequences in poor road and weather conditions or for inexperienced cyclist or the like. Other embodiments include larger and smaller degree design factors depending on the style of glove and particular vehicle application.

Figure 7:
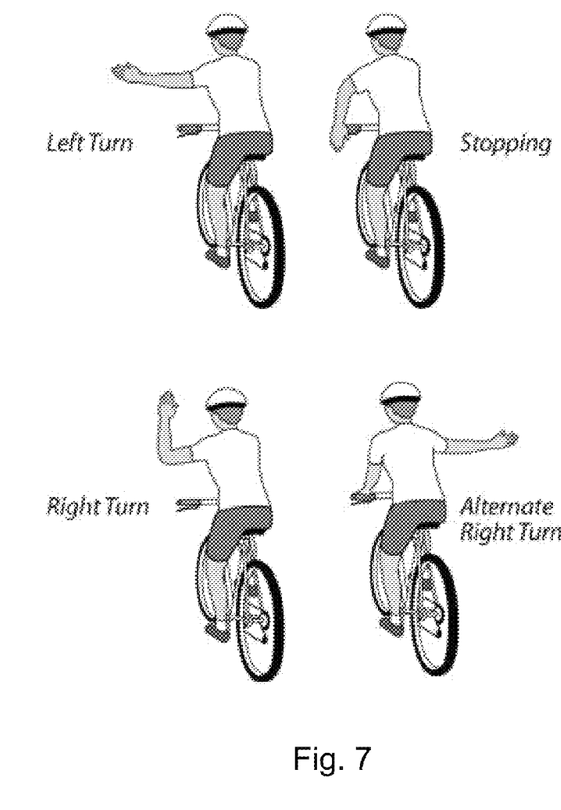
FIG. 7 illustrates motorist hand signals capable of being signaled using embodiments of the disclosure.

FIG. 7 shows examples of motorist hand signals that require hand movements to create lighting sequences of embodiments of the disclosure. Such hand signals include bicycling hand signals, motorcycle hand signals, snowmobile hand signals, all terrain vehicle hand signals and the like. To the extent these differ, the MEM can be programmed to react at the desired angles. In these other embodiments glove 1, wristband 7 may activate a lighting sequence of lights 4,5 under the influence of external accelerations and orientations and correlating to hand movements created by these other hand signals, e.g. by any of the elements and circuitry previously shown or described. In most embodiments, a memory associated with the CPU provides the CPU with lighting instructions that correlate with several hand motions. A look-up table may suffice. For instance, other examples include activating a lighting sequence in a stop position. Typically, to indicate an intention to stop or break, the motorist extends the arm perpendicular with the road. In this break/stop position, the glove 1 or wristband 7 is angled vertically downward. In this position, the accelerometer 3b may recognize the orientation and signal to the CPU 3a to activate the light 5 in the palm of hand. Other stop lights 5 may be positioned on the glove in a variety of arrangements visible to traffic, particularly traffic from behind the user wearing the glove 1 or wristband 7.

Other embodiments of hand signals in which glove 1 or wristband 7 may indicate the riders intentions to traffic. For instance, hand signals may include hand signals on snowmobiles, including: slowing, oncoming sled, sleds following, hazard left, hazard right and oncoming traffic.

Figure 8A:
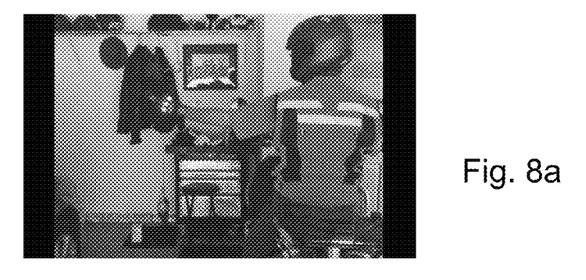
FIG. 8A illustrates the embodiment of FIGS. 1a and 1b signaling a left turn hand signal.
Figure 8B:
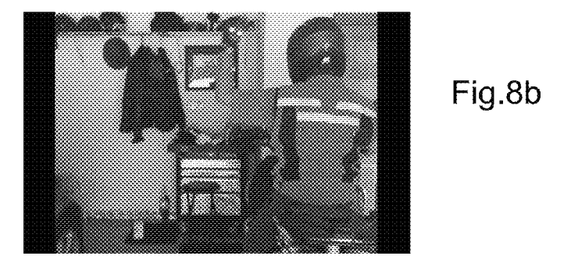
FIG. 8B illustrates the embodiment of FIGS. 1a and 1b signaling a right turn hand signal.

FIG. 8A shows one embodiment of the glove 1 illuminated while in the universal signal for a left turn. In this particular position, the user's arm, typically the left arm, is extended straight out in the direction of the turn, pinkie finger downward and thumb up. In this position, the longer direction of the figures of the glove 1 will be parallel with the road surface and perpendicular to the direction of travel on the road surface. The accelerometer 3b recognizes this orientation and signals to the CPU 3a to activate the lights 4 in a blinking sequence. Here, the glove is in about a zero degree orientation with respect to an axis parallel with the road surface which causes the lights 4 to illuminate. For example, the lights 4 blink at the same time twice a second. In other embodiments, the glove produces a blinking sequence of two times per second in the left turn signal position. Other sequences and the lack of sequences are within the scope of these inventions FIG. 8B shows one embodiment of the glove in the right turn signal position where the lights 4 blink in a sequence from left to right. A common signal for a right turn is to extend the upper awl out to the left, parallel to the road and change of the angle of the forearm vertically upward. Typically, in the United States and Canada, the left arm is used to signal the right turn. As shown, the fingertips of the glove 1 are in a vertical position and at a ninety degree angle with respect to the road surface. The accelerometer 3b recognizes this orientation and signals to the CPU 3a to activate the lights 4 in a blinking sequence. For example, the blinking sequence may run from out to in, i.e. first light 4, then second light 4, then third light 4 and the cycle would repeat. In some embodiments, the right turn signal blinking sequence runs one cycle per second, however other blinking sequences include a variety of arrangements.

Figure 8C:
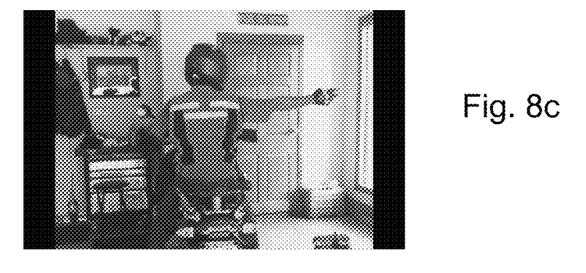
FIG. 8C illustrates the embodiment of FIGS. 1a and 1b signaling an alternative right turn hand signal.

FIG. 8C illustrates an embodiment of glove 1 in an alternative right turn hand signal position using right hand orientation. Here, in the alternative position of glove 1, the accelerometer 3b recognizes the one hundred and eighty degree orientation with respect to the road surface and signals to the CPU 3a to activate the lights 4 at the same time. In some examples, the lights blink in a sequence of about twice a second.

Typically, when the lights 4 of the glove 1 are blinking and the angle is not changed, for example, when the user removes the gloves for storage, the circuit will go to into a sleep mode, for example after about six seconds, typically regardless of orientation In other embodiments, the disclosure includes a smart glove safety kit. In one embodiment, the kit may comprise smart safety electronics and circuitry, e.g. any of the elements previously shown or described. Here, these elements may be embedded, for example sewn or similarly fastened, into a user's existing glove. Other embodiments of the kit include a variety of components, e.g. any of the elements previously shown or described, to assemble glove 1 or refabrciate an existing glove according to any of the inventions disclosed herein.

Other embodiments include a smart safety glove 1 or wristband 7 for snowmobile hand signals. Further, pedestrians and even horse-back riders could also take advantage of the safety beacon functions, in particular the short blinking sequence.

In yet further embodiments, the smart safety electronics and circuitry, e.g. any of the elements previously shown or described, may be positioned within a jacket sleeve or the like. For instance, leads to the smart safety electronics and circuitry, e.g. any of the elements previously shown or described, may extend through the jacket sleeve to the user's glove, wristband or the like. Additional embodiments include LEDs, e.g. any of the elements previously shown or described, on the jack sleeve, jacket back, helmet and the like.

Numerous characteristics and advantages have been set forth in the foregoing description, together with details of structure and function. Many of the novel features are pointed out in the appended claims. The disclosure, however, is illustrative only, and changes may be made in detail, especially in matters of shape, size, and arrangement of parts, within the principle of the disclosure, to the full extent indicated by the broad general meaning of the terms in which the general claims are expressed. It is further noted that, as used in this application, the singular forms "a," "an," and "the" include plural referents unless expressly and unequivocally limited to one referent.

I claim:

1. A safety glove for indicating intentions to traffic comprising:
    a enclosing shell having a palm side, distal ends configured for fingers, and a proximate end configured for a wrist;
    a printed circuit board (PCB) supporting a central processing unit (CPU) and an accelerometer affixed in the shell; and
    a light in electrical communication with the PCB and positioned visibly on the shell,
        whereby in a substantially horizontal position with respect to the road surface the glove is in a sleep mode and in a substantially vertical position with the road surface the light is illuminated and adapted to indicate intentions to traffic.

2. The glove of claim 1, including an electrical power supply having power supply conductors are positioned in the shell.

3. The glove of claim 1, wherein the accelerometer is a microelectromechanical (MEM) accelerometer.

4. The glove of claim 1, wherein the glove includes a battery positioned on the shell to power the PCB.

5. The glove of claim 1, wherein the lights are positioned on at least one portion of the shell, the at least one portion including the distal ends, the proximate end, and an outer surface.

6. The glove of claim 1, wherein the lights are light-emitting diodes (LEDs).

7. The glove of claim 1, wherein the palm side of said shell includes a layer of resilient padding.

8. The glove of claim 1, wherein the accelerometer is operably coupled with the CPU and adapted that movements of said accelerometer between a substantially horizontal position and a substantially vertical position causes the CPU to illuminate the light.

9. The glove of claim 1, wherein the safety glove comprises at least one of a cycling glove, a motorcycle glove, an athletic glove, a snowmobile glove, or an all-terrain vehicle glove.

10. The glove of claim 1, wherein the substantially vertical position is a right turning signal.

11. The glove of claim 1, wherein the substantially horizontal position is a left turning signal.

12. A safety apparatus for indicating intentions to traffic comprising:
    a shell of apparel mountable on the posterior end of a user's arm;
    a printed circuit board (PCB) supporting a central processing unit (CPU) and an accelerometer affixed to the shell;
    a battery affixed to in the shell to power the PCB; and
    a light in electrical communication with the PCB and positioned on the shell to be visible to the traffic,
        wherein the accelerometer is operably coupled with the CPU and adapted that movement of said shell between a substantially horizontal position with respect to the road surface and a substantially vertical position with respect to the road surface subjects the CPU to illuminate the light, and
        whereby in the substantially horizontal position for a period of time of more than a preset period the glove is in a sleep mode.

13. The apparatus of claim 12, wherein the substantially vertical position is a right turning signal.

14. The apparatus of claim 12, wherein the substantially horizontal position is a left turning signal.

15. The apparatus of claim 12, wherein the lights are positioned on at least one portion of the shell, the at least one portion including the distal ends, the proximate end, and an outer surface.

16. The apparatus of claim 12, wherein the accelerometer is a microelectromechanical (MEM) accelerometer.

17. A kit for attachment to a glove to enable movement of hand wearing the glove to aid in providing hand signals, the kit comprising:
    a. an accelerometer;
    b. a central processing unit (CPU);
    c. a power source; and
    d. a light,
        wherein the accelerometer, CUP, power source and light may be affixed to a glove and be electrically connected together.

18. The kit of claim 17, wherein the CPU has programming to provide the accelerometer signals indicated acceleration orientation.

19. The kit of claim 17, wherein the CPU translates the accelerations signals to signals to the light to selectively illuminate the lights in accordance with a hand signal being given by the hand wearing the glove.

* * * * *